April 1, 1969 — J. M. POWELL — 3,435,971

SPARE TIRE AND WHEEL RACK

Filed Nov. 30, 1966

INVENTOR
Jack M. Powell

BY

ATTORNEY

United States Patent Office 3,435,971
Patented Apr. 1, 1969

3,435,971
SPARE TIRE AND WHEEL RACK
Jack M. Powell, 110 W. Mitchell St.,
Arlington, Tex. 76010
Filed Nov. 30, 1966, Ser. No. 598,042
Int. Cl. B62d 43/04
U.S. Cl. 214—451                    1 Claim

ABSTRACT OF THE DISCLOSURE

A spare wheel rack or carrier for pickup trucks adapted to be suspended beneath the truck frame rearwardly thereof and comprising a cradle in which the spare wheel is removably supported on a carriage having a shaft transversely of its forward end, the shaft having a roller on each end thereof arranged on rearwardly inclined tracks, one at each side of the cradle whereby the carriage is slidable rearwardly of the truck frame and lowered to the ground for convenient access to the spare wheel, and having a central bar or strap for supporting the carriage in porting position.

---

This invention relates to a carriage for spare wheels for pickup trucks, and particularly a wheel support capable of being withdrawn from beneath the body of the vehicle for ready access.

A prime object of the invention is that of providing a simple and economical carrier by which a spare wheel may be stored inconspicuously below the bed of a pickup truck having a structure as described, in a partly concealed position below the frame of the truck, forwardly of the rear bumper, while at the same time the spare wheel is readily accessible and may be easily and conveniently secured in place in its stored position, below the bed of the truck, and removed therefrom.

A further object of the invention resides in the provision of a spare wheel carrier as described which is characterized by its lightweight construction and has a minimum of parts, and which may be produced inexpensively, and is efficient in operation and durable in use.

Broadly, the invention contemplates the provision of a spare wheel carrier in which is embodied features by which the spare wheel, by its own weight, will aid in its accessibility, and a structure by which the wheel can be completely removed from its support with a minimum of effort and at substantial saving in time.

Figure 1:
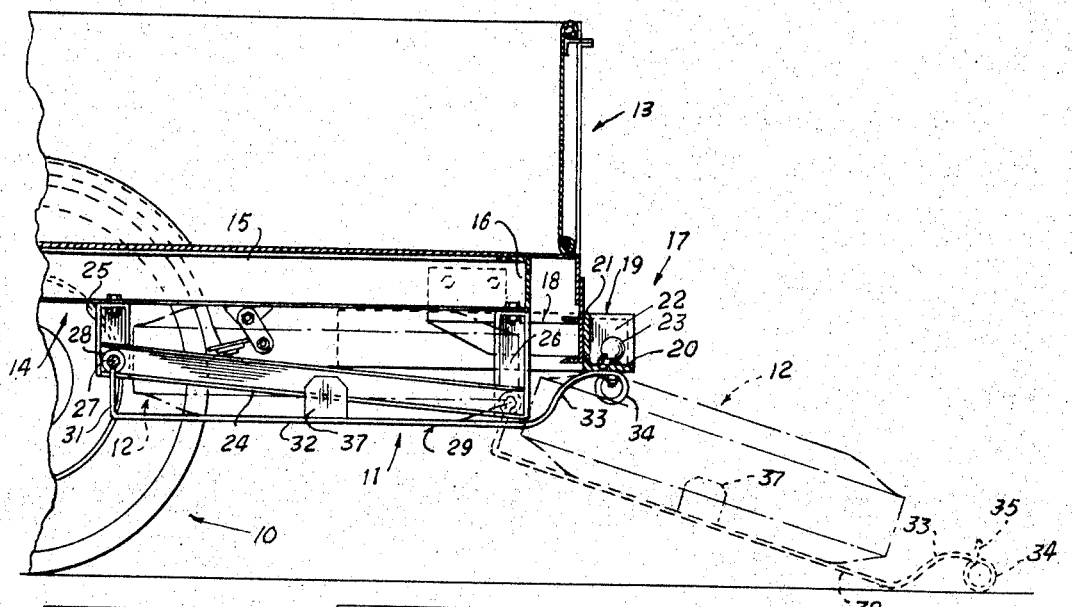
Figure 3:
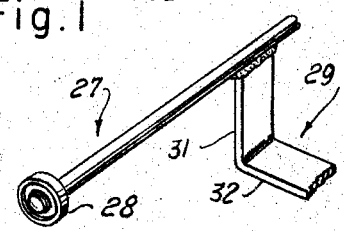
Figure 4:
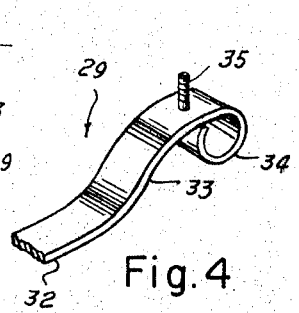
Figure 2:
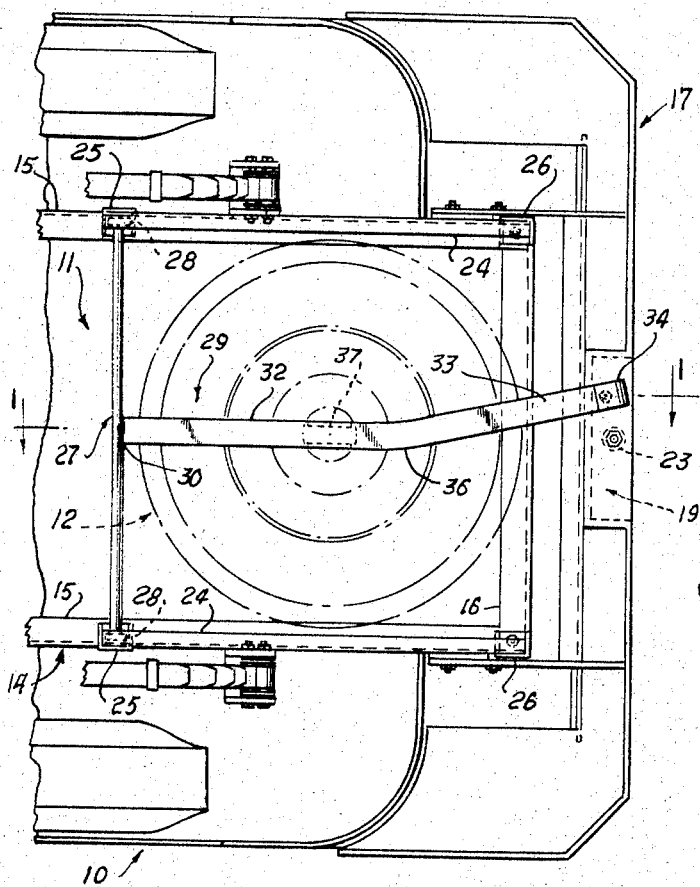

While the foregoing objects are paramount, other and lesser objects will become apparent as the description proceeds, when considered in connection with the appended drawings wherein:

FIGURE 1 is a fragmentary longitudinal sectional elevational view, taken on the line 1—1 of FIGURE 2, showing a pickup truck having a structure as described, and having a spare wheel carrier embodying the invention applied thereto, showing a spare wheel in broken lines, and showing in broken lines a relatively movable portion of the carrier in one of its operative positions in which it extends rearwardly of the truck and is supported partly on the ground, FIGURE 2 is a fragmentary bottom plan view of the truck and the carrier substantially as illustrated in FIGURE 1, and FIGURES 3 and 4 are fragmentary perspective views on an enlarged scale showing details of construction.

Referring to the drawing, the numeral 10 designates generally a pickup truck, shown fragmentarily. The numeral 11 indicates generally a spare wheel carrier embodying the invention, and the numeral 12 indicates generally a spare wheel, shown in broken lines.

The truck 10 has a bed 13 rearwardly thereof, and has a frame 14 extending below the bed 13. The frame 14 includes a pair of side rails 15, channel shaped in transverse section, extending longitudinally of the truck 10, in spaced apart relation to each other, and a transverse member 16, also channel shaped in transverse section, connecting the side rails 15 at their rearward ends.

The truck 10 has a rear bumper 17, connected by depending, rearwardly extending brackets 18 to the side rails 15 and extending rearwardly and laterally outwardly beyond the frame 14 and below it, which is characterized by its inverted, box-like structure and its planar top and sides, and forms a step extending around the rear end of the truck 10. The bumper 17 is typical and is not necessarily a requisite in the installation of the invention.

The bumper 17, as shown, has a recessed portion 19 intermediate its ends, open at the top and rearwardly thereof, which provides a horizontally extending shelf 20, enclosed on three sides by an upstanding front wall 21 and two adjoining side walls 22, for convenience in displaying a license plate (not shown) on the front wall 21 and for attachment of one element of a trailer hitch, indicated by the numeral 23, to the horizontally extending shelf 20.

The space wheel carrier 11 comprises a cradle for a spare wheel, adapted to support a spare wheel, such as the wheel 12, in a horizontally extending position while preventing lateral displacement thereof in any direction, as hereinafter described.

The cradle which comprises the spare wheel carrier 11 is formed in part by a pair of elongated members 24, channel shaped in transverse section, which are arranged below the respective side rails 15 and rigidly connected in spaced apart relation thereto by two pairs of depending members 25 and 26, which are of unequal lengths. The elongated members 24, which have their side flanges facing inwardly, in opposing relation to each other, are inclined downwardly in a rearward direction, and form between them a pair of tracks, closed at their ends. The spare wheel 12 reposes between the members 24 when in transport position.

The cradle which comprises the spare wheel carrier 11 further includes an axle 27, which is arranged transversely of the elongated members 24 and has a pair of rollers 28 journaled on its opposite end portions, arranged to travel along said tracks, and an elongated substantially rigid metal strip 29 is arranged perpendicular to the axle 27 and is rigidly connected thereto, as at 30, intermediate the ends of the axle 27.

The metal strip 29 is bent laterally at a slight angle intermediate its ends, and near its rear end is bent transversely at right-angles to form a portion 31 by which it depends from the axle 27, a second portion 32 adjoining the first portion 31 and extending horizontally in a rearward direction, and a third portion 33 curved upwardly and rearwardly from the second portion 32 for attachment to the under side of the bumper 17 intermediate its ends. The extreme rearward end portion of the metal strip 29 is rolled downwardly and inwardly, as at 34, to form an abutment for engagement with the ground, as shown in broken lines in FIGURE 1, in the extended position of the metal strip 29 rearwardly of and below the truck 10 and is inclined downwardly from its forward end.

The member 29, which is connected by a bolt 35, shown in FIGURE 4, to the under side of the bumper 17 intermediate its ends, is bent at an obtuse angle, in a lateral direction, intermediate its ends, as at 36, so that its rearward end portion, which coincides with the position of the bolt 35, is positioned near one end of the horizontally extending shelf 20 intermediate the ends of the bumper 17, on one side of the trailer hitch element 23, which as shown is positioned centrally of the horizontally extending shelf 20.

A vertical lug 37 is rigidly attached to the member 29 intermediate its ends to be received in the spare wheel 12 whereby the latter is centered in its cradle as described and is positively secured against lateral displacement in any direction relative thereto.

The invention may be modified within certain limitations by persons skilled in the art without departing from the spirit and intent thereof or the scope of the appended claim.

What is claimed is:

1. A spare wheel carrier for pickup trucks having a frame comprising a pair of spaced parallel members and a bumper on said frame, the said carrier comprising a pair of track members, channel shaped in transverse section, having their forward ends connected to said truck frame members with their flanged sides extending inwardly in opposing relationship and inclined rearwardly beneath said truck frame, an axle arranged transversely of said track members and having a roller on each end thereof and rotatably supported on said track members, a metal strip having its forward end bent upwardly at right angles and rigidly connected to and depending from said axle intermediate its ends and extending rearwardly therefrom, the said axle providing a hinge for said strip, a lug on said strip intermediate its ends for engagement by the hub of a spare wheel supported thereon, the said strip having an upward bend near its free end and rolled downwardly and rearwardly providing an abutment for the ground when said strip is extended for access to said wheel, and means on the free end of said strip for attachment to the vehicle bumper for supporting said wheel.

References Cited

UNITED STATES PATENTS

| | | | |
|---|---|---|---|
| 1,813,094 | 7/1931 | Appel | 214—451 |
| 3,012,685 | 12/1961 | Toyama | 214—454 |
| 3,369,683 | 2/1968 | Richards | 214—454 |

HUGO O. SCHULZ, *Primary Examiner.*

U.S. Cl. X.R.

224—42.21, 42.23